(12) United States Patent
Isobe et al.

(10) Patent No.: US 9,243,696 B2
(45) Date of Patent: Jan. 26, 2016

(54) LINK ACTUATING DEVICE

(75) Inventors: Hiroshi Isobe, Iwata (JP); Hiroyuki Yamada, Iwata (JP); Yukihiro Nishio, Iwata (JP)

(73) Assignee: NTN CORPORATION, Osaka (JP)

( * ) Notice: Subject to any disclaimer, the term of this patent is extended or adjusted under 35 U.S.C. 154(b) by 119 days.

(21) Appl. No.: 14/346,606

(22) PCT Filed: Sep. 11, 2012

(86) PCT No.: PCT/JP2012/073142
§ 371 (c)(1),
(2), (4) Date: Mar. 21, 2014

(87) PCT Pub. No.: WO2013/042577
PCT Pub. Date: Mar. 28, 2013

(65) Prior Publication Data
US 2014/0224046 A1    Aug. 14, 2014

(30) Foreign Application Priority Data
Sep. 22, 2011   (JP) ................................. 2011-207724

(51) Int. Cl.
*B25J 17/00*   (2006.01)
*B25J 17/02*   (2006.01)
(Continued)

(52) U.S. Cl.
CPC ............... *F16H 19/08* (2013.01); *B25J 9/0048* (2013.01); *B25J 9/102* (2013.01); *F16H 37/14* (2013.01); *F16H 21/46* (2013.01); *Y10T 74/188* (2015.01); *Y10T 74/18792* (2015.01)

(58) Field of Classification Search
CPC ...... B25J 9/0048; B25J 17/0266; B25J 9/102; B25J 9/0051; B25J 9/1623
See application file for complete search history.

(56) References Cited

U.S. PATENT DOCUMENTS

| 8,316,961 B2 | 11/2012 | Isobe et al. | |
| 2005/0199085 A1* | 9/2005 | Isobe | B25J 9/0048 74/490.05 |

(Continued)

FOREIGN PATENT DOCUMENTS

| EP | 0 987 087 A2 | 3/2000 |
| JP | 2000-94245 | 4/2000 |

(Continued)

OTHER PUBLICATIONS

Japanese Office Action dated Jun. 2, 2015 in corresponding Japanese Patent Application No. 2011-207724.

(Continued)

*Primary Examiner* — William Kelleher
*Assistant Examiner* — Jake Cook

(57) ABSTRACT

A distal side link hub is connected with a proximal end side link hub through three sets of link mechanisms for alteration in posture. At least two sets of the link mechanisms include an actuator for arbitrarily changing the posture of the distal end side link hub relative to the proximal end side link hub by rotating a proximal side end link member and a reduction gear unit for reducing the speed of and transmitting the operation amount of the actuator to the proximal side end link member. The reduction gear unit includes a geared speed reducing section having a small gear rotated by the actuator and a large gear provided in the proximal side end link member. The radius of pitch circle of the large gear is chosen to be equal to or greater than the arm length of the proximal side end link member.

14 Claims, 9 Drawing Sheets

(51) Int. Cl.
*B25J 18/00* (2006.01)
*F16H 19/08* (2006.01)
*F16H 37/14* (2006.01)
*B25J 9/00* (2006.01)
*B25J 9/10* (2006.01)
*F16H 21/46* (2006.01)

(56) References Cited

U.S. PATENT DOCUMENTS

| | | | |
|---|---|---|---|
| 2008/0028881 A1* | 2/2008 | Sone | B25J 17/0266 74/471 R |
| 2009/0095108 A1* | 4/2009 | Payandeh | A61B 19/22 74/480 R |
| 2011/0113915 A1* | 5/2011 | Zhang | B25J 17/0266 74/490.01 |
| 2012/0043100 A1 | 2/2012 | Isobe et al. | |
| 2013/0055843 A1* | 3/2013 | Isobe | F16C 1/02 74/490.04 |

FOREIGN PATENT DOCUMENTS

| | | |
|---|---|---|
| JP | 2001-129740 | 5/2001 |
| JP | 2005-305585 | 4/2005 |
| JP | 2005-127475 | 5/2005 |
| JP | 2010-260139 | 11/2010 |

OTHER PUBLICATIONS

International Search Report mailed Dec. 6, 2012, in corresponding International Application No. PCT/JP2012/073142.

PCT International Preliminary Report on Patentability mailed Apr. 3, 2014 in corresponding International Application No. PCT/JP2012/073142.

* cited by examiner

LINK ACTUATING DEVICE

CROSS REFERENCE TO THE RELATED APPLICATIONS

This application is a U.S. national stage application of PCT/JP2011/073142 filed Sep. 11, 2012, and claims foreign priority benefit of Japanese Application No. 2011-207724 filed Sep. 22, 2011, in the Japanese Intellectual Property Office, the contents of both of which are incorporated herein by reference.

BACKGROUND OF THE INVENTION

1. Field of the Invention

The present invention relates to a link actuating device which can be used in a link mechanism such as, for example, a parallel link mechanism or a robot joint for executing, accurately and at high speed, a process work such as, for example, a complicated processing or a goods handling in the three dimensional space.

2. Description of Related Art

One example of the working device equipped with the parallel link mechanism is disclosed in the patent document 1 listed below. The working device disclosed in the patent document 1 is so designed that the position and the attitude of a traveling plate having a tool fitted thereto can be changed by a parallel link mechanism. The parallel link mechanism referred to above is provided with a plurality of links with the travelling plate connected to lower ends thereof while upper portions of those links are angularly variably supported by a universal joint. The parallel link mechanism is so designed that for each link the effective length that can be positioned below the universal joint can be altered.

PRIOR ART LITERATURE

Patent Document 1: JP Laid-open Patent Publication No. 2000-094245

In the parallel link mechanism of the structure discussed above, the operating angle of each link is small and therefore, in order to increase the operating range of the travelling plate, the parallel link mechanism requires the link length to be increased. Accordingly, a problem has been found that the dimension of the mechanism as a whole increases and the apparatus tends to be bulky in size. Also, if the link length is increased, the rigidity of the mechanism as a whole tends to be lowered. For this reason, there has been a problem that the weight of a tool mounted on the travelling plate, that is, the weight capacity of the travelling plate is limited to a small value.

SUMMARY OF THE INVENTION

In view of the foregoing, the present invention has for its object to provide a link actuating device that is compact in size and has a high rigidity, in which the operating range of a movable section is large and a posture adjusting accuracy is high.

In order to accomplish the foregoing object of the present invention, a link actuating device designed in accordance with the present invention includes a proximal end side link hub, a distal end side link hub and three or more sets of link mechanisms to connect the proximal end side link hub with the distal end side link hub for alteration in posture. Each of the link mechanisms includes proximal and distal side end link members, which are rotatably connected at one ends thereof with the proximal end side link hub and the distal end side link hub, respectively, and an intermediate link member to rotatably connect the proximal and distal side end members at the other ends. Each of the link mechanism is of such a shape that a geometric model of the link mechanism depicted in a line represents that a distal end side portion and a proximal end side portion relative to a center portion of the corresponding intermediate link member are symmetrical relative to each other. In other words, the link actuating device of the present invention includes a proximal end side link hub, a distal end side link hub and three or more sets of the link mechanisms, in which each of the link mechanisms includes proximal and distal end link members rotatably connected with the proximal end side link hub and the distal end side link hub, respectively, and the proximal side and distal side end link members are connected rotatably with the intermediate link member. With respect to the cross section at a center portion of each of the link mechanisms the distal end side and the proximal end side are geometrically identical with each other.

In the link actuating device of the present invention, at least two of the three or more sets of the link mechanisms are provided with an actuator to rotate the proximal side end link member to thereby arbitrarily alter the posture of the distal end side link hub relative to the proximal end side link hub and a reduction gear unit to reduce the speed of and transmit the amount of operation of the actuator to the proximal side end link member. The reduction gear unit referred to above includes a geared speed reducing section having a combination of a small gear and a large gear, in which the small gear is rotated by the drive of the actuator and the large gear is provided in the proximal side end link member for rotation about a first revolute pair axis of the proximal end side link hub and the proximal side end link member. In such case, the large gear has a radius of pitch circle greater than that of the small gear, and the radius of the pitch circle of the large gear is equal to or greater than ½ of the arm length of the proximal side end link member. The arm length referred to above is defined by the distance from a first axial center point of the first revolute pair axis to a point at which a second axial center point of a second revolute pair axis of the proximal side end link member and the intermediate link member is projected on a plane passing through the first axial center point and right angles to the first revolute pair axis.

According to the foregoing construction, a two-degrees-of-freedom mechanism movable in two directions perpendicular to each other is composed of the distal end side link hub, the proximal end side link hub and the three or more sets of the link mechanisms. This two-degrees-of-freedom mechanism, despite of the compact size, provides a wide range of movement of the distal end side link hub. For example, the maximum bending angle between a center axis of the proximal end side link hub and a center axis of the distal end side link hub is about ±90° and the angle of traverse of the distal end side link hub relative to the proximal end side link hub can be set to the range of 0 to 360°. When the rotation of the actuator is, after having been reduced in speed by the reduction gear unit, is transmitted to the proximal side end link member of at least two sets of the three or more sets of the link mechanisms so as to rotate the proximal side end link member only a predetermined angle, the posture of the distal end side link hub can be arbitrarily changed relative to the proximal end side link hub.

When the radius of the pitch circle of the large gear is chosen to be equal to or greater than ½ of the arm length of the proximal side end link member, the bending moment of the proximal side end link member, which is brought about by a distal end loading, is rendered to be small. Therefore, the rigidity of the link actuating device as a whole can be maintained at a value not higher than necessary, and also the weight of the proximal side end link member can be reduced. Also, since the radius of the pitch circle of the large gear is relatively large, the surface pressure on a tooth portion of the large gear decreases and the rigidity of the link actuating device as a whole increases. In addition, since the speed reducing ratio of the geared speed reducing section having the small gear and the large gear can be set to a high value, the actuator can be made compact in size, and also the positioning resolution by an encoder or the like can be increased. Therefore, the positioning resolution of the distal end side link hub can be increased. Also, if the radius of the pitch circle of the large gear is equal to or greater than ½ of the arm length, the large gear has a sufficiently larger diameter than the outer diameter of a bearing installed at a revolute pair of the proximal end side link hub and the proximal side end link member. Therefore, a space can be made between a tooth portion of the large gear and the bearing, allowing the large gear to be installed easily.

In a preferred embodiment of the present invention, the radius of the pitch circle of the large gear may be equal to or greater than the arm length of the proximal side end link member. According to this feature, the radius of the pitch circle of the large gear become further large, and the functions and effects described above can be conspicuously brought about. Also, the small gear can be installed on an outer diametric side remote from the link mechanism. As a result, the space for installation of the small gear can be easily secured and, hence, the degree of freedom of designing increases. In addition, any possible interference will hardly occur between the small gear and any other member and, hence, the range of movement of the link actuating device expands.

In another preferred embodiment of the present invention, the large gear may be a member separate from the proximal side end link member and is removable relative to the proximal side end link member. Alternatively, the large gear may be a member integral with the proximal side end link member.

Where the large gear is a member separate from the proximal side end link member, the specification such as, for example, speed reducing ratio of the reduction gear unit and the range of operation of the distal end side link hub relative to the proximal end side link hub can be changed easily, and as a result, the mass productivity of the link actuating devices increases. In other words, merely by changing the large gear, the same link actuating device can be used in various applications. Also, the maintenance is good. For example, in the event of any trouble occurring in the reduction gear unit, the trouble can be removed by the mere replacement of the reduction gear unit.

Where the large gear is a member integral with the proximal side end link member, the number of component parts can be reduced and the assemblability increases. Also, since a slip between the proximal side end link member and the large gear is removed, the rigidity and the positioning accuracy of the link actuating device increase.

In a further preferred embodiment of the present invention, the speed reducing ratio of the speed reducing unit may be 10 or higher. If the speed reducing ratio is so high, the actuator of a low output can be used and there is no need of incorporating the reduction gear unit in the actuator. Therefore, the actuator can be made compact in size. Also, since the positioning resolution of, for example, the encoder or the like increases, the positioning resolution of the distal end side link hub increases.

In a still further preferred embodiment of the present invention, the small gear may have a tooth portion, which is engageable with the large gear, and a pair of shank portions extending from the tooth portion in a direction axially towards opposite sides, in which case each of the pair of the opposite shank portions is rotatably supported by a bearing. If the small gear is supported at its axial shank portions, the support rigidity of the small gear increase. Therefore, the angle retention rigidity of the proximal side end link member brought about by the distal end loading increase, accompanied by a tendency to increase the rigidity and the positioning accuracy of the link actuating device.

In a yet further preferred embodiment of the present invention, each of the small gear and the large gear may be employed in the form of a spur gear. The manufacture of the small and large gears, which are in the form of spur gears, is easy and, yet, the transmission efficiency of the rotation is high Where each of the small gear and the large gear is employed in the form of a spur gear, the actuator referred to above is a rotary actuator having a rotation axis disposed coaxially with a rotation axis of the small gear, and those rotation axes are preferably disposed on a plane perpendicular to a center axis of the proximal end side link hub and passing through the first revolute pair axis of the proximal end side link hub and the proximal side end link member. According to this feature, the rotation axis of the rotary actuator, the rotation axis of the small gear and the first revolute pair axis of the proximal end side link hub and the proximal side end link member lie on the same plane and, therefore, the balance of the whole is good and the assemblability increases.

In a yet further preferred embodiment of the present invention, the small gear may be a worm and, in such case, the large gear is employed in the form of a worm wheel. In this case, the small gear and the large gear can be easily constructed and a high speed reduction ratio can be obtained. Also, in the case of the worm and the work wheel, it is possible to design that a reverse input from the side of the worm wheel to the worm may be restricted. Therefore, even when the distal end loading acts, no power is transmitted from the worm wheel to the worm. Accordingly, the angle retention rigidity of the proximal side end link member is rendered to be high, and as a result, the rigidity of the link actuating device increases.

In a yet further preferred embodiment of the present invention, three sets of the link mechanisms may be employed, in which case the actuator and the reduction gear unit are provided in all of those three sets of the link mechanisms. Since the minimum number of the sets of the link mechanisms required to form the link actuating device is three sets, the use of the three sets of the link mechanisms makes it possible for the link actuating device as a whole to be made compact in size. Also, with the actuator and the reduction gear unit provided in all of the three sets of the link mechanisms, it is possible to drive in a good balance even though the distal end side link hub takes any posture relative to the proximal end side link hub. In other words, the balance of the driving force is good. Accordingly, each of the actuators can be made compact in size. Also, the use of the actuator and the reduction gear unit in all of the three sets of the link mechanisms makes it possible to control so that a rattling motion occurring in each of the link mechanism and the reduction gear unit due to gaps therein can be removed. Therefore, the positioning accuracy of the distal end side link hub can be increased, and also, the high rigidity of the link actuating device itself can be realized.

In a yet further preferred embodiment of the present invention, there may be provided a preloading mechanism to generate a force between first and second spherical link centers, in which the first spherical link center is a spherical link center of the link mechanism in the proximal end side link hub and the second spherical link center is a spherical link center of the link mechanism in the distal end side link hub. By applying the preload between the first and second spherical link centers, the rattling motion in the link actuating device can be removed and, therefore, the positioning accuracy of the distal end side link hub can be increased, and also, the high rigidity of the link actuating device itself can be realized.

The preloading mechanism referred to above may have a rod member having its opposite ends formed to represent spherical shapes, in which case the spherically shaped opposite ends of the rod member are slidingly engaged in respective spherically shaped recessed portions formed in the proximal end side link hub and the distal end side link hub and each of the recessed portions has a center aligned with each of the first and second spherical link centers. Alternatively, the preloading mechanism may be of a type in which the distal end side link hub and the proximal end side link hub are connected together by means of an elastic member disposed in a straight line connecting the first and second spherical link centers. Whichever the preloading mechanism is employed, a force can be generated between the first and second spherical link centers and, therefore, the positioning accuracy of the distal end side link hub can be increased, and also the high rigidity of the link actuating device itself can be realized.

In a yet further preferred embodiment of the present invention, assuming that the angle of rotation of the proximal side end link member relative to the proximal end side link hub is expressed by $\beta n$, the angle formed between a connecting end axis of the intermediate link member, which is rotatably connected with the proximal side end link member, and a connecting end axis of the intermediate link member, which is rotatably connected with the distal side end link member is expressed by $\gamma$, the angle of spacing of each of the proximal side end link members relative to the proximal side end link member, which serves as a reference, in a circumferential direction is expressed by $\delta n$, the vertical angle of inclination of a center axis of the distal end side link hub relative to a center axis of the proximal end side link hub is expressed by $\theta$, and the horizontal angle of inclination of the center axis of the distal end side link hub relative to the center axis of the proximal end side link hub is expressed by $\phi$, the posture of the distal end side link hub relative to the proximal end side link hub is preferably controlled when the following equation is reverse conversed;

$$[\cos(\theta/2)\sin \beta n]-[\sin(\theta/2)\sin(\phi+\delta n)\cos \beta n]+\sin(\gamma/2)=0$$

If the posture of the distal end side link hub relative to the proximal end side link hub is assigned, the rotation angle of each of the proximal side end link members can be calculated according to the equation referred to above. When, based on the calculated value, output is made to the actuator for driving each of the proximal side end link members, the posture of the distal end side link hub relative to the proximal end side link hub can be controlled.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
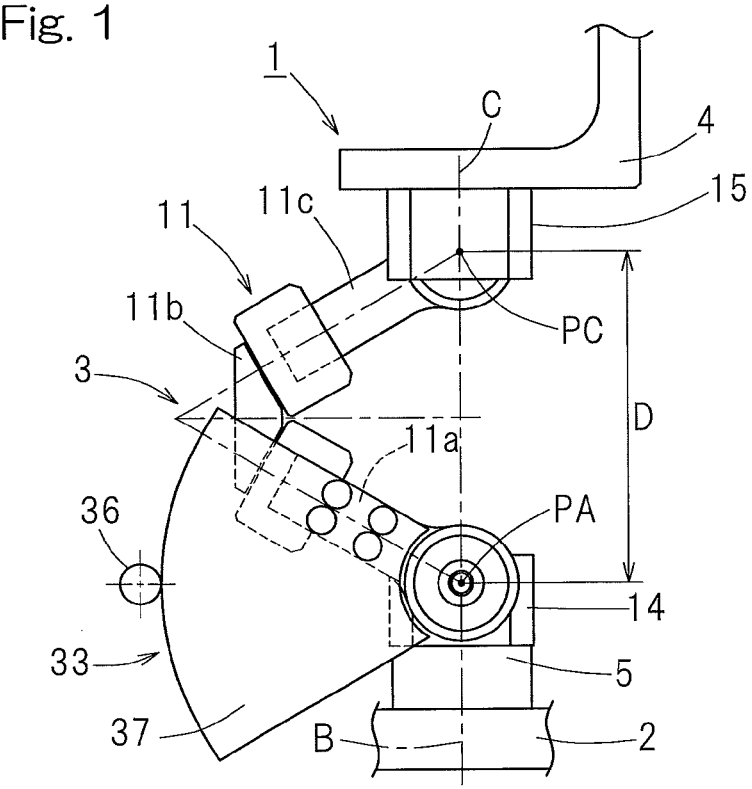
FIG. 1 is a front elevational view showing, with a portion thereof removed, a link actuating device designed in accordance with a first preferred embodiment of the present invention.
Figure 2:
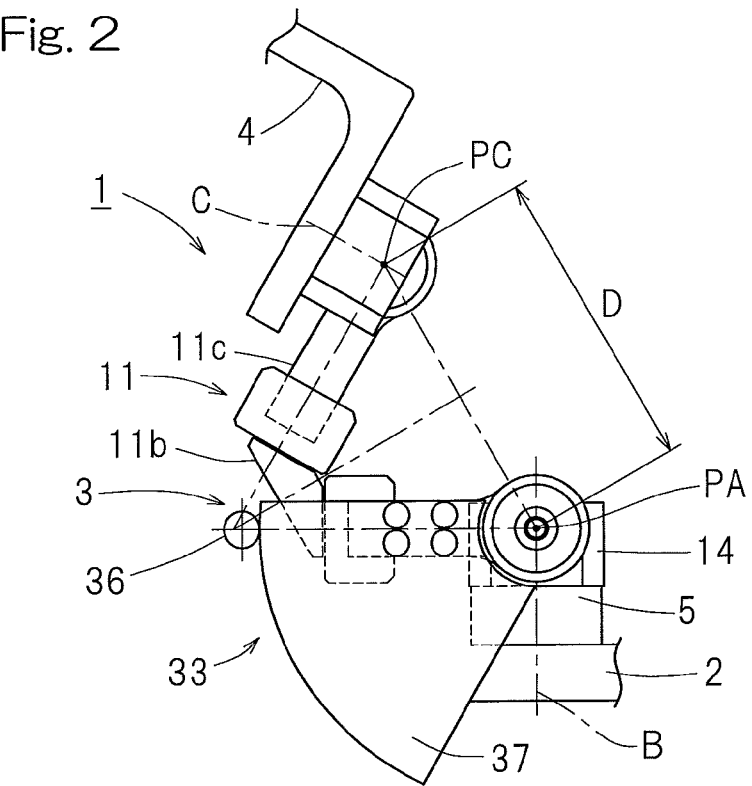
FIG. 2 is a front elevational view showing, with a portion thereof removed, the link actuating device in a different operative position.

A first preferred embodiment of the present invention will be described in detail with particular reference to FIGS. 1 to 6. As shown in FIGS. 1 and 2, a link actuating device 1 shown therein is of a type having a distal end mounting member 4, in which a medical tool or the like is fitted, connected with a base 2 through a link mechanism section 3 for alteration in posture. The link mechanism section 3 includes a proximal end side link hub 14 fixed to the base 2 through a spacer 5, a distal end side link hub 15 fixed to the distal end mounting member 4, and three sets of link mechanisms 11, 12 and 13 connecting between the proximal end side link hub 14 and the distal end side link hub 15. It is to be noted that FIGS. 1 and 2 show one of the three sets of the link mechanisms, for example, the link mechanism 11.

Figure 3:
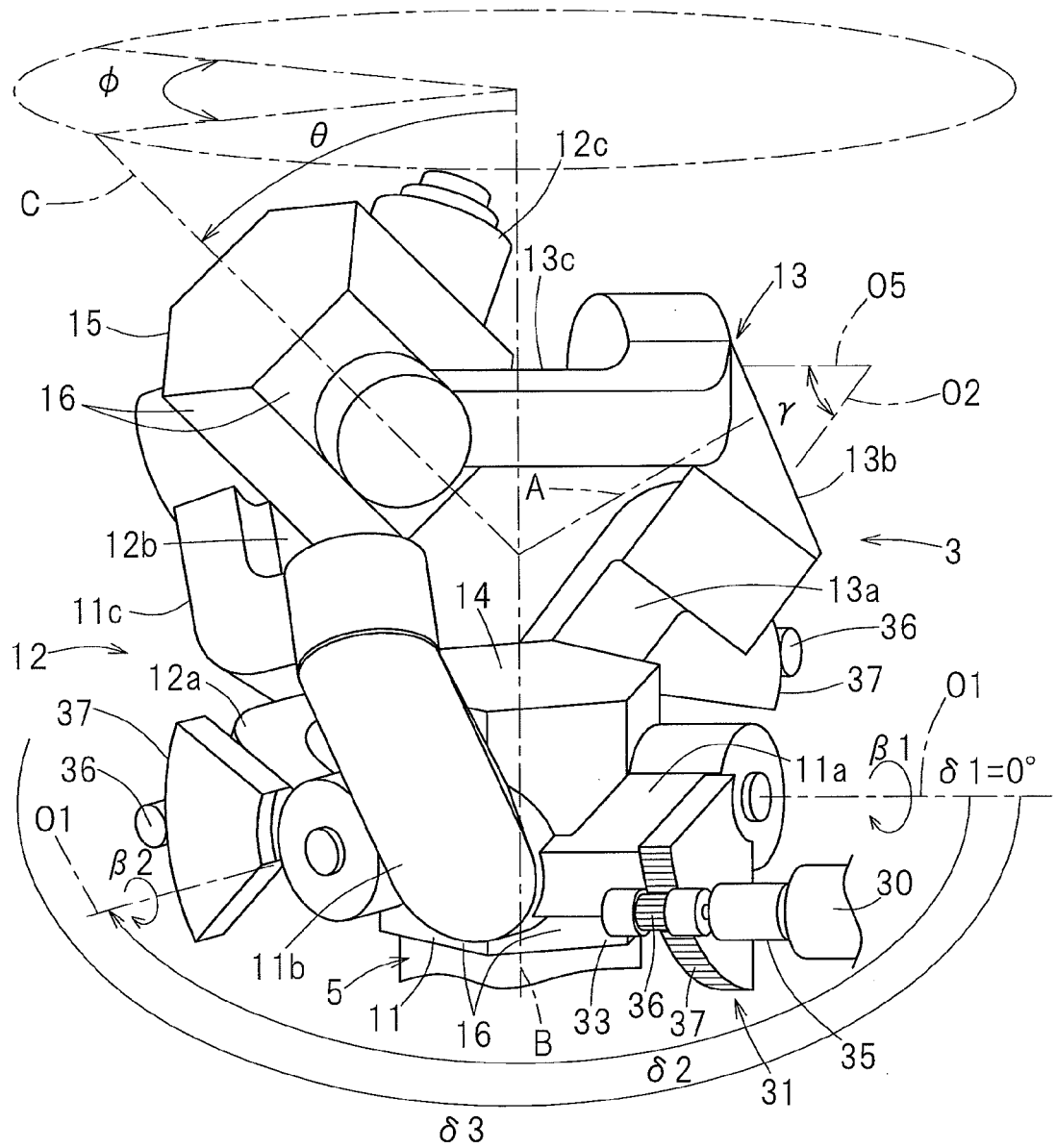
FIG. 3 is a perspective view of the link actuating device.

FIG. 3 is a perspective view showing the link mechanism section 3. The three sets of the link mechanism 11, 12 and 13

(hereinafter, indicated by 11 to 13) are of a geometrically identical structure with each other. In other words, each of the link mechanisms 11 to 13, when represented by a geometric model depicted in the form of line drawing of each link members 11a to 13a, 11b to 13b and 11c to 13c, is of such a shape that a distal end side portion and a proximal end side portion are symmetrical to each other with respect to an intermediate portion of the intermediate link member 11b to 13b.

Each of the link mechanisms 11, 12 and 13 represents a trinodal chain link mechanism made up of a proximal side end link member 11a, 12a or 13a (hereinafter, indicated by 11a to 13a) on a proximal end side, an intermediate link member 11b, 12b or 13b (hereinafter, indicated by 11b to 13b) and a distal side end link member 11c, 12c or 13c (hereinafter, indicated by 11c to 13c) on a distal end side and having four revolute pairs. The proximal side and distal side end link members 11a to 13a and 11c to 13c are of an L-shaped configuration, with their one ends connected rotatably with the proximal end side link hub 14 and the distal side end link hub 15, respectively. The intermediate link member 11b to 13b has its opposite ends connected rotatably with the other end of the proximal side end link member 11a to 13a and the other end of the distal side end link member 11c to 13c.

The proximal side end link member 11a to 13a and the distal side end link member 11c to 13c are of a spherical link structure, in which proximal end side spherical link centers PA and distal end side spherical link centers PC (best shown in FIGS. 1 and 2) in the three sets of the link mechanisms 11 to 13 are aligned with each other, respectively. A distance from the proximal end side spherical link center PA to each of the proximal side end link members 11a to 13a is equal among the link mechanisms 11 to 13 and a distance from the distal end side spherical link center PC to each of the distal side end link members 11c to 13c is equal among the link mechanisms 11 to 13. Revolute pair axes, which are represented by respective joints between the proximal side and distal side end link members 11a to 13a and 11c to 13c and the intermediate link member 11b to 13b may form either crossed axes angles or parallel to each other.

Figure 4:
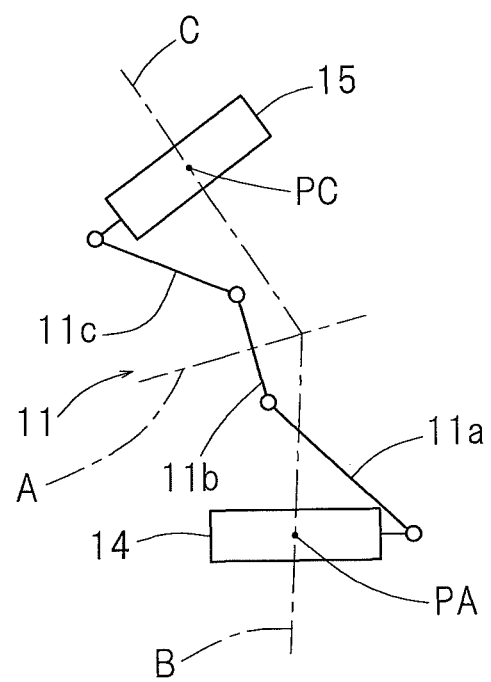
FIG. 4 is a schematic diagram showing, in the form of a line drawing, one of link mechanisms forming respective parts of the link actuating device.

In other words, the three sets of the link mechanisms 11 to 13 are of the geometrically identical configuration. The term "geometrically identical configuration" is intended to mean that the geometric model depicted in the form of line drawings of each link members 11a to 13a, 11b to 13b and 11c to 13c represents such a shape that the proximal end side portion and the distal end side portion are symmetrical to each other with respect to the intermediate portion of the intermediate link member 11b to 13b. FIG. 4 is a schematic diagram showing one of the link mechanisms 11 in the line drawing.

The link mechanism 11 to 13 employed in the practice of this embodiment is of a rotation symmetrical type, and employs such a positional structure that the positional relationship between a group of the proximal end side link hub 14 and the proximal side end link member 11a to 13a and a group of the distal end side link hub 15 and the distal side end link member 11c to 13c is rotational symmetrical about a center axis A of the intermediate link member 11b to 13b. FIG. 1 illustrates a condition in which a center axis B of the proximal end side link hub 14 and a center axis C of the distal end side link hub 15 lie on the same line whereas FIG. 2 illustrates a condition in which the center axis C of the distal end side link hub 15 assumes an operating angle relative to the center axis B of the proximal end side link hub 14. Even though each of the link mechanisms 11 to 13 changes in posture, the distance D between the proximal and distal end side spherical link centers PA and PC does not change.

The proximal end side link hub 14 and the distal end side link hub 15 are of a shape similar to a hexagonal column, and the proximal side and distal side end link members 11a to 13 and 11c to 13c, respectively, are connected with three of six side surface areas 16, forming an outer peripheral surface and spaced from each other at intervals of every other side surface areas.

Figure 5:
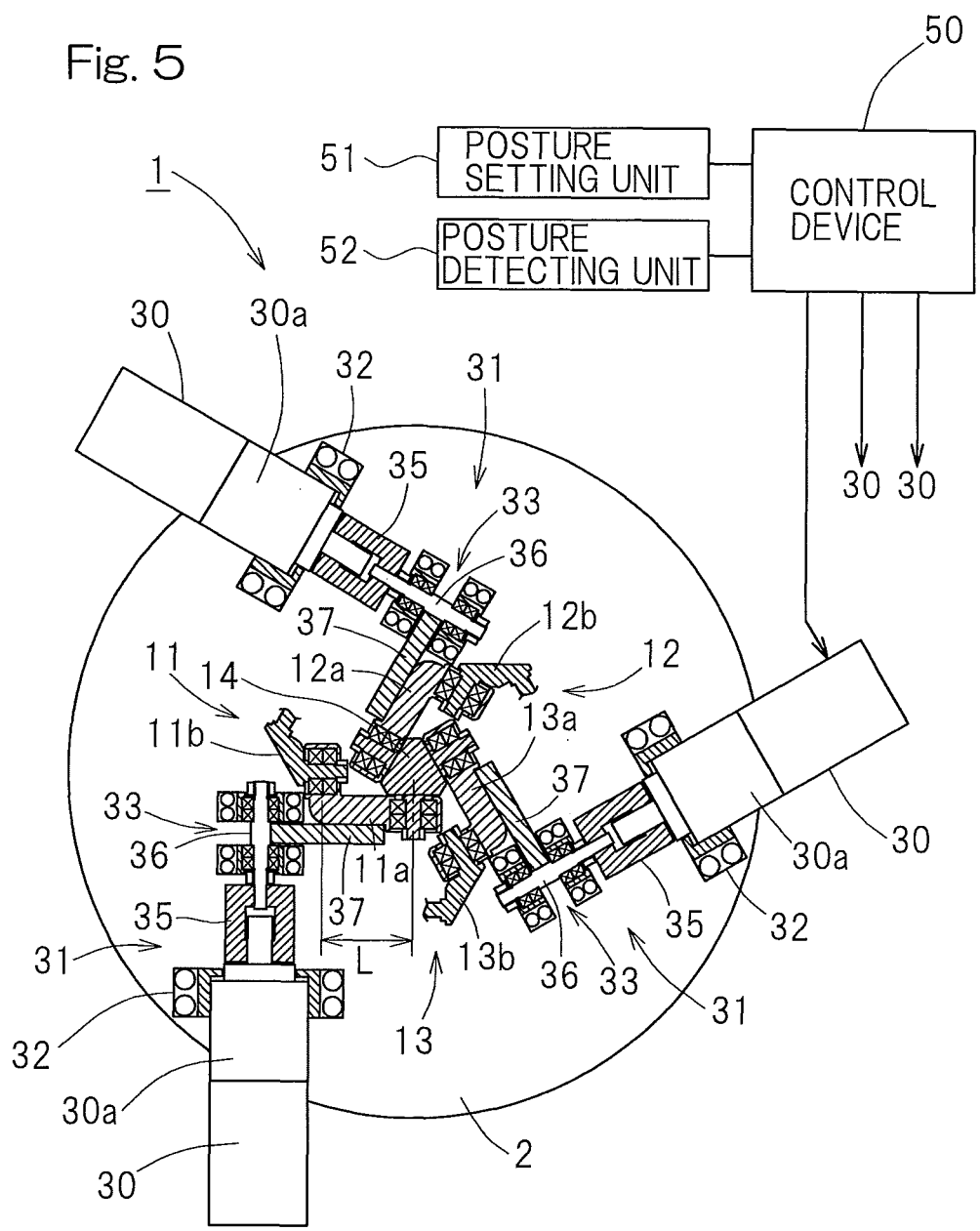
FIG. 5 is a longitudinal sectional view showing a proximal end side link hub, a proximal side end link member and an intermediate link member of the link actuating device.
Figure 6:
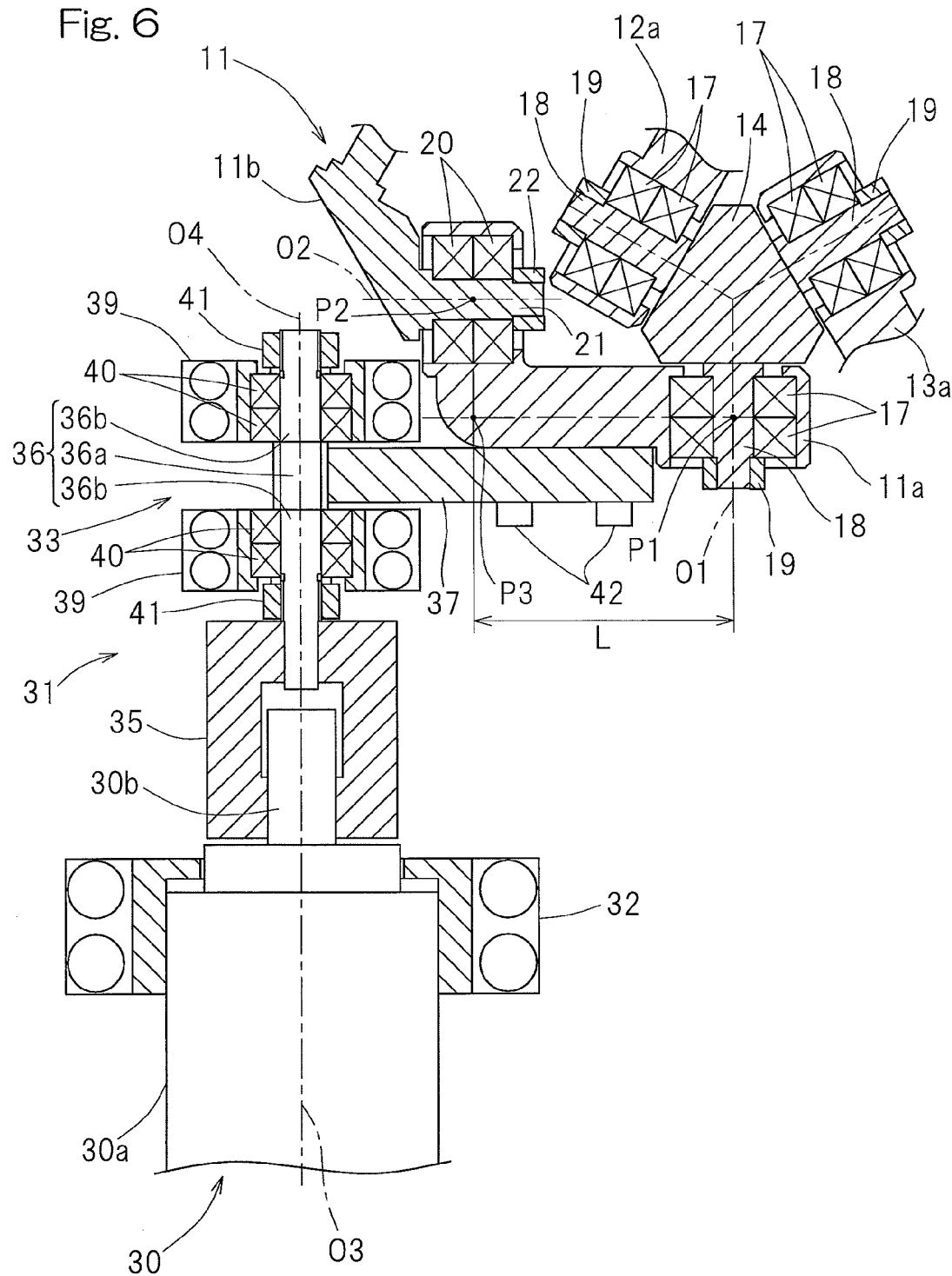
FIG. 6 is a fragmentary enlarged view of FIG. 5.

FIG. 5 illustrates a longitudinal sectional view showing a joint between the proximal end side link hub 14 and the proximal side end link member 11a to 13a and FIG. 6 is a fragmentary enlarged view thereof. A shaft portion 18 (best shown in FIG. 6) protrudes outwardly from the side surface area 16 (FIG. 3) of the proximal end side link hub 14 and inner rings (not shown) of double row bearings 17 (best shown in FIG. 6) are externally mounted on the shaft portion 18, and outer rings (not shown) of the bearings 17 are internally mounted on respective end portions of the proximal side end link members 11a to 13a adjacent the proximal end side link hub. In other words, the inner ring is fixed to the proximal end side link hub 14 and the outer ring is rotatable together with the proximal side end link member 11a to 13a. The bearing 17 is employed in the form of a ball bearing such as, for example, a deep groove ball bearing or an angular contact ball bearing and is fixed in position under a predetermined preload amount by means of fastening of a nut 19 (as shown in FIG. 6). For the bearing 17, other than the ball bearing arranged in a plurality of, for example, double, rows as shown, a roller bearing and/or a slide bearing may be employed. A joint between the distal end side link hub 15 and the distal side end link member 11c to 13c is also of the same structure as that described above.

Also, the joint between the proximal side end link member 11a to 13a and the intermediate link member 11b to 13b is rotatably connected together through a double row bearing 20. In other words, an outer ring (not shown) of the bearing 20 is internally mounted on the proximal side end link member 11a to 13a and an inner ring (also not shown) of the bearing 20 is externally mounted on a shaft portion 21 provided in the intermediate link member 11b to 13b. It is to be noted that FIGS. 5 and 6 show only the joint between the proximal side end link member 11a and the intermediate link member 11b. The bearing 20 referred to above may be employed in the form of a ball bearing such as, for example, a deep groove ball bearing and/or an angular contact ball bearing and is fixed under a predetermined preload amount by means of fastening of a corresponding nut 22. For the bearing 20, other than the ball bearing arranged in a plurality of, for example, double, rows as shown, a roller bearing and/or a slide bearing may be employed. A joint between the distal side end link member 11c to 13c and the corresponding intermediate link members 11b to 13b is also of the same structure as that described above.

In the link mechanism 11 to 13 shown in FIG. 3, when the angle and the length of the shaft portion 18 in each of the proximal end side and distal end side link hubs 14 and 15, and the geometric shape of the proximal side and distal side end link members 11a to 13a and 11c to 13c are equal between the proximal end side and the distal end side, and, also, even in the intermediate link member 11b to 13b, the shape on the distal end side and that on the proximal end side are equal to each other, the angular positional relationship with respect to the symmetry plane of the intermediate link members 11b to 13b between the proximal side and distal side end link members 11a to 13a and 11c to 13c and the intermediate link members 11b to 13b is so chosen as to be identical between the distal end side and the proximal end side. In such case, the group of the proximal end side link hub 14 and the proximal side end link member 11a to 13a and the group of the distal end side link hub 15 and the distal side end link member 11c to 13c move in the same manner due to geometric symmetry. By way of example, where rotary shafts are provided in the proximal end side and the distal end side link hubs 14 and 15 in a fashion coaxial with the center axes B and C and the rotation transmission is made from the proximal end side towards the distal end side, a constant velocity universal joint is formed in which the proximal end side and the distal end side rotate the same angle of rotation at an equal speed. Symmetrical surfaces of the intermediate link members 11b to 13b at the constant speed rotation as discussed above is known as constant velocity bisecting plane.

As discussed above, by disposing the link mechanisms 11 to 13 of the same geometrical shape, which commonly utilize the proximal end side link hub 14 and the distal end side link hub 15, on the circumference or periphery, as respective positions at which the plurality of the link mechanisms 11 to 13 can move with no ambiguity, the intermediate link members 11b to 13b are limited to respective movement in the constant velocity bisecting plane. Accordingly, a constant velocity rotation can be obtained even though the proximal end side and the distal end side take an arbitrary working angle.

The link mechanisms 11 to 13 include rotating parts of four revolute pairs, that is, the joint between the proximal end side link hub 14 and the proximal side end link member 11a to 13a, the joint between the distal end side link hub 15 and the distal side end link member 11c to 13c, and two joints between the proximal side and distal side end link members 11a to 13a and 11c and 13c and the intermediate link member 11b to 13b. If such rotating parts of the four revolute pairs are so structured as to represent bearing supporting structures, the rotational resistance can be relieved by suppressing the frictional resistance occurring at each of those joints. Therefore, a smooth power transmission can be secured, and also the durability thereof increases.

According to the structure of the link mechanism section 3, the range of movement of the distal end side link hub 15 relative to the proximal end side link hub 14 can be expanded. For example, the maximum value (the maximum bending angle) of the bending angle θ between the center axis B of the proximal end side link hub 14 and the center axis C of the distal end side link hub 15 can be set to about ±90°. Also, the angle of traverse φ of the distal end side link hub 15 relative to the proximal end side link hub 14 can be set within the range of 0 to 360°. The bending angle θ referred to above means a vertical angle in which the center axis C of the distal end side link hub 15 is inclined relative to the center axis B of the proximal end side link hub 14, and the angle of traverse φ referred to above means a horizontal angle in which the center axis C of the distal end side link hub 15 is inclined relative to the center axis B of the proximal end side link hub 14.

Two of the three or more sets of the link mechanisms 11 to 13 are each provided with an actuator 30 for altering the attitude of the distal end side link hub 15 relative to the proximal end side link hub 14 by rotating the proximal side end link member 11a to 13a and a reduction gear unit 31 for transmitting the amount of operation of the actuator 30 to the proximal side end link member 11a to 13a after reducing the speed thereof. In the illustrated example, all of the three or more sets of the link mechanisms 11 to 13 are each provided with the actuator 30 and the reduction gear unit 31. In the description that follows, the actuator 30 and the reduction gear unit 31, both provided in the link mechanism 11, will be described with particular reference to FIGS. 5 and 6, it being to be noted that those provided in each of the link mechanisms 12 and 13 is to be understood as being each identical in construction with those described above.

As shown in FIG. 5, the actuator 30 is in the form of a rotary actuator, more specifically a servomotor of a type equipped with a reduction gear 30a and is fixed to the base 2 by means of a motor fixing member 32. The reduction gear unit 31 is comprised of the reduction gear 30a of the actuator 30 and a geared speed reducing section 33.

The geared speed reducing section 33 includes a small gear 36, connected with an output shaft 30b of the actuator 30 through a coupling 35 in a rotation transmittable fashion, and a large gear 37 fixed to the proximal side end link member 11a and meshed with the small gear 36. In the example as shown, the small gear 36 and the large gear 37 are each in the form of a spur gear, and the large gear 37 is a sector gear having gear teeth formed in a sector shaped peripheral surface. The large gear 37 has a radius of pitch circle that is greater than that of the small gear 36 and the rotation of the output shaft 30b of the actuator 30 is transmitted to the proximal side end link member 11a after it has been reduced in speed into rotation about a first revolute pair axis O1 of the proximal end side link hub 14 and the proximal side end link member 11a. The speed reducing ration thereof is rendered to be 10 or more.

The radius of the pitch circle of the large gear 37 is so chosen as to be ½ or more of an arm length L of the proximal side end link member 11a. The arm length L referred to above is represented by the distance from a first axial center point P1 of the first revolute pair axis O1 between the proximal end side link hub 14 and the proximal side end link member 11a to a point P3, in which a second axial center point P2 of a second revolute pair axis O2 between the proximal side end link member 11a and the intermediate link member 11b is projected on a plane passing through the first axial center point P1 at right angles to the first revolute pair axis O1. In the case of the illustrated embodiment, the radius of the pitch circle of the large gear 37 is equal to or greater than the arm length L referred to above. For this reason, it is advantageous in securing a large speed reducing ratio.

The small gear 36 has a tooth portion 36a meshed with the large gear 37 and shank portions 36b protruding towards opposite sides of the tooth portion 36a. The shank portions 36b are rotatably supported by respective double row bearings 40 provided on the rotation support member 39 disposed on the base 2. The bearing 40 is in the form of a ball bearing such as, for example, a deep groove ball bearing and/or an angular contact ball bearing. Other than the ball bearing disposed in a plurality of rows as shown, a roller bearing and/or a slide bearing may be employed. Respective outer rings (not shown) of the double row bearings 40 have a shim (not shown) disposed therebetween and, by fastening a nut 41 threadingly engaged with the shank portion 36b, the bearing 40 is so structured as to receive a preload. The outer ring of the bearing 40 is press fitted into the rotation support member 39.

The large gear 37 is a member separate from the proximal side end link member 11a and is removably fitted to the proximal side end link member 11a by means of a connecting member 42 such as, for example, a bolt.

As shown in FIG. 6, a rotation axis O3 of the actuator 30 and a rotation axis O4 of the small gear 36 lie on the same axis. Those rotation axes O3 and O4 are rendered to be parallel to the first revolute pair axis O1 between the proximal end side link hub 14 and the proximal side end link member 11a and at the same level from the base 2.

As shown in FIG. 5, each of the actuators 30 is controlled by a control device 50. This control device 50 is of a type capable of being numerically controlled and provides each of those actuators 30 with an output command on the basis of a signal from a posture setting unit 51, which is operable to set a posture of the distal end side link hub 15 relative to the proximal end side link hub 14, and a signal from a posture detecting unit 52 for detecting the posture of the distal end side link hub 15 relative to the proximal end side link hub 14. The posture setting unit 51 referred to above is operable to set the posture of the distal end side link hub 15 by regulating, for example, the bending angle θ (best shown in FIG. 3) and the traverse angle φ (also best shown in FIG. 3). The posture detecting unit 52 referred to above is operable to detect the angle of rotation βn (β1 and β2 shown in FIG. 3) of each of the proximal side end link members 11a to 13a by means of, for example, an encoder (not shown). Alternatively, an encoder (not shown) of the actuator 30 may be used for the detection of the posture of the distal end side link hub 15. The bending angle θ and the traverse angle φ has a mutual relationship with each of the angles βn of rotation and from one value the other value can be delivered.

Where the posture of the distal end side link hub 15 relative to the proximal end side link hub 14 is to be altered, a control target value of each of the rotation angles βn of the proximal side end link members 11a to 13a is calculated in dependence on the posture of the distal end side link hub 15 set by the posture setting unit 51. The rotation angle βn referred to above means the operating position of the actuator 30. The calculation of the rotation angle βn is carried out by inverse transformation or reverse conversion of the following equation (1) set forth below. The inverse transformation referred to above is a transformation for calculating the rotation angle βn of the proximal side end link member 11a to 13a from the bending angle θ and the transverse angle φ.

$$[\cos(\theta/2)\sin \beta n] - [\sin(\theta/2)\sin(\phi+\delta n)\cos \beta n] + \sin(\gamma/2) = 0 \quad (1)$$

In this equation (1) above, γ (best shown in FIG. 3) stands for the angle formed between the second revolute pair axis O2, of the proximal side end link member 11a to 13a and the intermediate link member 11b to 13b, and the revolute pair axis O5, of the distal side end link member 11c to 13c and the intermediate link member 11b to 13b; and δn (δ1, δ2 and δ3 shown in FIG. 3) stands for the angle of spacing of each of the proximal side end link members 11a to 13a relative to the proximal side end link member 11a, that serves as a reference, in a circumferential direction.

If the control target value of the rotational angle βn is calculated, by a feedback control utilizing the signal of the posture detecting unit 52, an output of each of the actuators 30 is so controlled that the actual rotational angle βn attains the control target value. By so doing, all of the proximal side end link members 11a to 13a in the link mechanisms 11 to 13 are rotated only the predetermined rotational angle βn, causing the distal end side link hub 15 to be altered to the posture preset by the posture setting unit 51.

The link actuating device 1 includes the three sets of the link mechanisms 11 to 13. Since the minimum required number of the link mechanisms forming the link actuating device is three sets, the use of the three sets of the link mechanisms makes it possible to render the link actuating device as a whole to have a compact size. The link actuating device 1 is such that the distal end side link hub 15 is constructed relative to the proximal end side link hub 14 as a two-degrees-of-freedom mechanism movable in two directions perpendicular to each other. Therefore, despite of the compact size, a wide range of movement of the distal end side link hub 15 can be secured. For this reason, the handlability of, for example, a medical tool that is fitted to the distal end mounting member 4 is good.

In view of the fact that the actuator 30 and the reduction gear unit 31 are provided in all of the link mechanisms 11 to 13, the distal end side link hub 15 can be driven in good balance relative to the proximal end side link hub 14 regardless of the posture assumed by the distal end side link hub 15. In other words, the balance of the driving force is good. Accordingly, each of the actuators 30 can be made compact in size. Also, the provision of the actuator 30 and the reduction gear unit 31 in all of the link mechanisms 11 to 13 of the three sets makes it possible to control so that rattling motions of the link mechanism section 3 and/or the reduction gear unit 31 due to gaps therein can be cut down. Hence, the positioning accuracy of the distal end side link hub 15 can be increased, and also, the link actuating device 1 itself can have a high rigidity.

The geared speed reducing section 33 of the reduction gear unit 31 is comprised of a combination of the small gear 36 and the large gear 37 and is capable of providing the speed reducing ration of 10 or higher. If the speed reducing ratio is so high, the positioning resolution of, for example the encoder becomes high and, therefore, the positioning resolution of the distal end side link hub 15 increases. Also, the actuator 30 of a low output can be used. In the embodiment now under discussion, although the actuator 30 of the type equipped with the reduction gear 30a is used, if the speed reducing ratio of the geared speed reducing section 33 is high, it is possible to use the actuator 30 of a type having no speed reducing section and, as a result, the actuator 30 can be reduced in size.

The radius of the pitch circle of the large gear 37 is chosen to be equal to ½ or more of the arm length L of the proximal side end link member 11a to 13a and, therefore, the bending moment of the proximal side end link member 11a to 13a, which is brought about by a distal end loading, becomes small. For this reason, the rigidity of the link actuating device 1 as a whole can be maintained at a value not higher than necessary, and also the weight of the proximal side end link member 11a to 13a can be reduced. By way of example, material for the proximal side end link member 11a to 13a can be changed from stainless steel (SUS) to aluminum. Also, since the radius of the pitch circle of the large gear 37 is relatively large, the surface pressure of a teeth portion of the large gear 37 decreases and the rigidity of the link actuating device 1 as a whole increases. Also, if the radius of the pitch circle is equal to or greater than ½ of the arm length as discussed above, the large gear 37 comes to have a sufficiently larger diameter than the outer diameter of the bearing 17 that is disposed at the first revolute pair between the proximal end side link hub 14 and the proximal side end link member 11a to 13a. Hence, a space is created between the tooth portion of the large gear 37 and the bearing 17 enough to facilitate positioning of the large gear 37.

Particularly in the case of the embodiment now under discussion, since the radius of the pitch circle of the large gear 37 is equal to or greater than the arm length L, the radius of the pitch circle of the large gear 37 increase further and functions and effects, which are herein described previously, are further considerably exhibited. In addition, it is possible to position the small gear 36 on an outer diametric side remote from the link mechanism 11 to 13. As a result, the space for installation of the small gear 36 can be easily secured and the degree of freedom of designing increases. Also, the interference between the small gear 36 and any other member or members will occur hardly and the range of movement of the link actuating device 1 expands.

Since the small gear 36 and the large gear 37 are employed each in the form of a spur gear, the manufacture is easy to accomplish and the transmission efficiency of rotation is high. Since the small gear 36 is supported by the bearing 40 on axially opposite sides, the support rigidity of the small gear 36 is high. Accordingly, the angle retaining rigidity of the proximal side end link member 11a to 13a, which is brought about by the distal end loading, increases, and as a result, an increase of the rigidity and the positioning accuracy of the link actuating device 1 can be achieved. Also, since the rotation axis O3 of the actuator 30, the rotation axis O4 of the small gear 36 and the first revolute pair axis O1 between the proximal end side link hub 14 and the proximal side end link member 11a to 13 lie on the same plane, the overall balance is good and the assemblability is also good.

Since the large gear 37 is removable relative to the proximal side end link member 11a to 13a, change in specification such as, for example, the range of operation of the distal end side link hub 15 relative to the proximal end side link hub 14 is easy and the mass productivity of the link actuating device 1 increases accordingly. In other words, the same link actuating devices 1 can be applied in various applications merely by changing the large gear 37. Also, the maintenance is good. By way of example, where any trouble occurs in the geared speed reducing section 33, mere replacement of only the speed reducing section 33 is enough.

Figure 7:
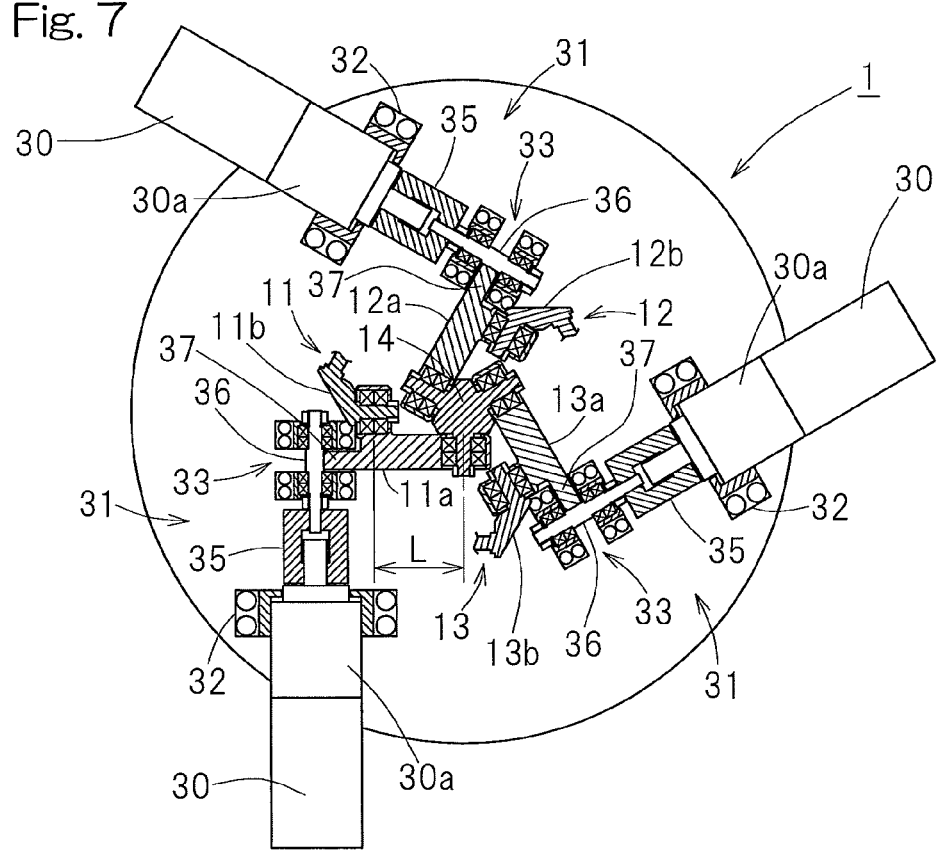
FIG. 7 is a longitudinal sectional view showing a proximal end side link hub, a proximal side end link member and an intermediate link member of the link actuating device designed in accordance with a second preferred embodiment of the present invention.

As is the case with a second preferred embodiment of the present invention shown in FIG. 7, the large gear 37 may be a member integral with the proximal side end link member 11a to 13a. In this case, number of parts can be reduced and the assemblability increases. Also, since a slip between the proximal side end link member 11a to 13a and the large gear 37 is eliminated, the rigidity and the positioning accuracy of the link actuating device 1 increases.

Figure 8:
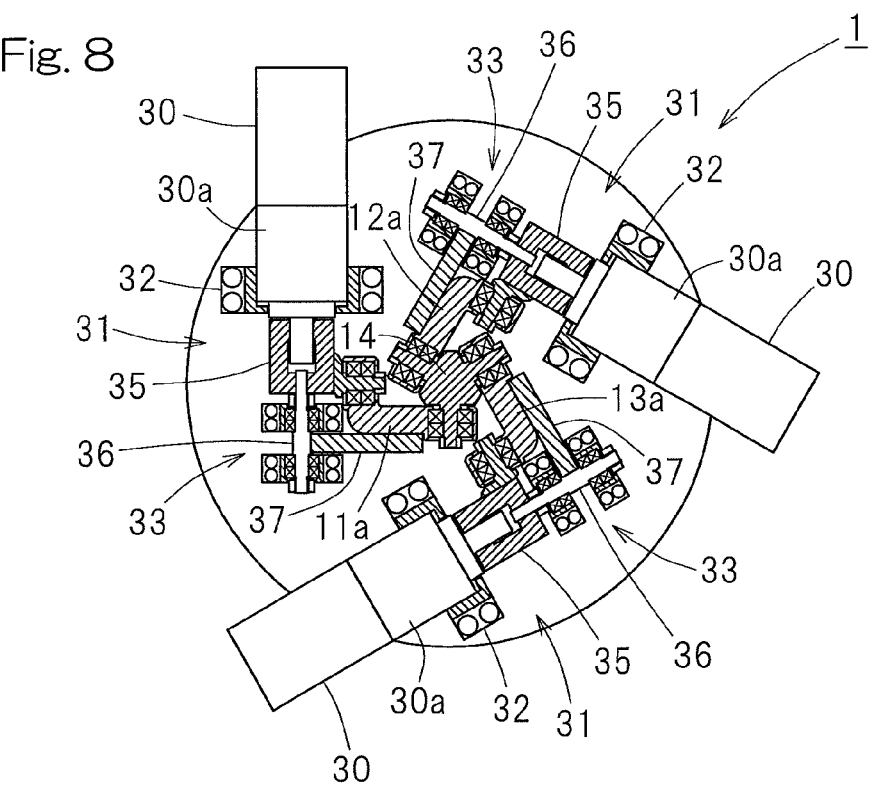
FIG. 8 is a longitudinal sectional view showing a proximal end side link hub, a proximal side end link member and an intermediate link member of the link actuating device designed in accordance with a third preferred embodiment of the present invention.

Also, as is the case with a third preferred embodiment of the present invention as shown in FIG. 8, the actuator 30 may be disposed at a position reverse to the small gear 36. Other than the position of the actuator 30, it is the same as that in the embodiment shown in and described with reference to FIGS. 1 to 6. In the case of the third embodiment, although it may occur that the range of operation will be narrowed as a result of interference of the intermediate link member 11b to 13b with the actuator 30 and/or the motor fixing member 32, the entirety may assume a compact structure.

Figure 9:
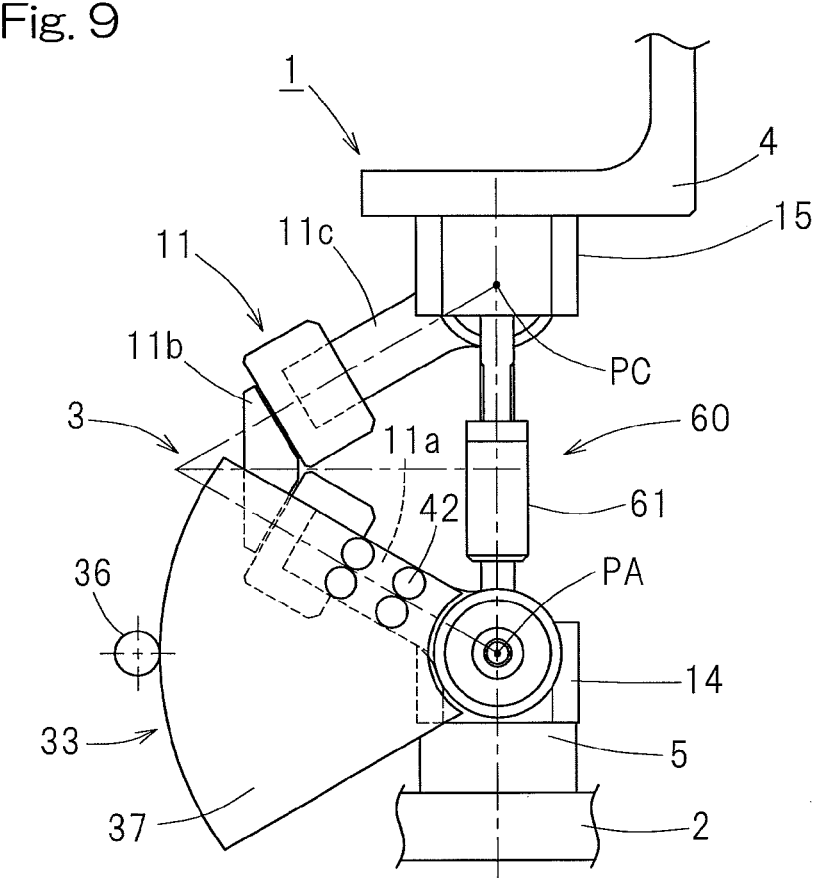
FIG. 9 is a front elevational view showing, with a portion removed, the link actuating device designed in accordance with a fourth preferred embodiment of the present invention.
Figure 10:
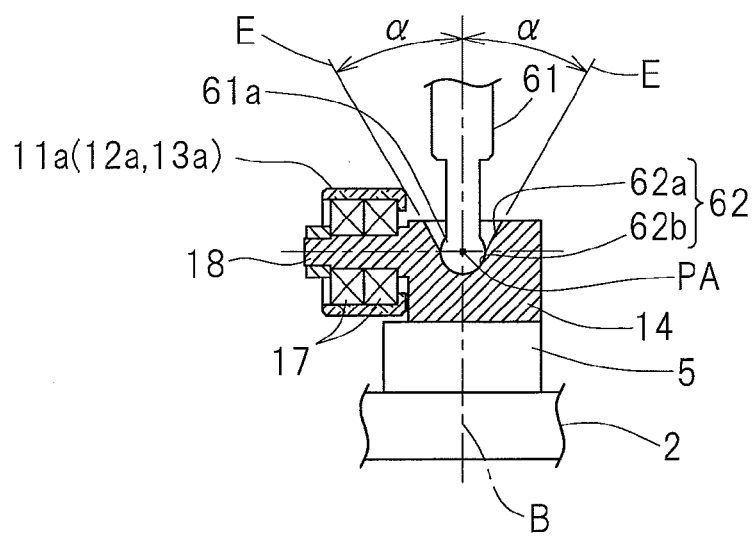
FIG. 10 is a fragmentary sectional view of the link actuating device.
Figure 11:
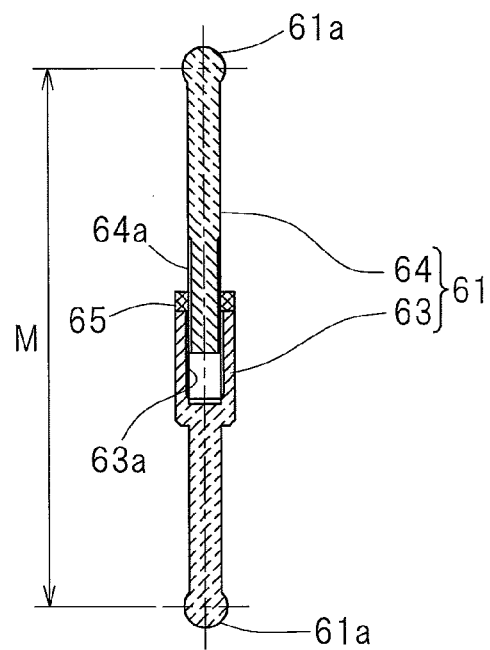
FIG. 11 is an enlarged view of a structural body of the link actuating device.

FIGS. 9 to 11 illustrate a fourth preferred embodiment of the present invention. As best shown in FIG. 9, the link actuating device 1 according to this fourth embodiment is similar to that shown in and described with reference to FIGS. 1 to 6 in connection with the previously described first embodiment, but differs therefrom in respect that in the fourth embodiment the use of a preloading mechanism 60 is made for generating a force between the first and second spherical link centers PA and PC of each of the link mechanisms 11 to 13 in the proximal end side link hub 14 and the distal end side link hub 15. Other than the use of the preloading mechanism 60, it is similar in structure to that shown and described in connection with the foregoing first embodiment.

The preloading mechanism 60 referred to above includes a rod member 61 having its opposite end portions 61a so shaped as to represent a spherical shape as shown in FIG. 11. As shown in FIG. 10, the proximal end side link hub 14 and the distal end side link hub 15 are formed with respective recessed portions 62 for slidingly receiving the corresponding spherically shaped opposite ends 61a of the rod member 61. Although FIG. 10 illustrates the recessed portion 62 in the proximal end side link hub 14, the recessed portion 62 in the distal end side link hub 15 is similar thereto. The recessed portion 62 opens in an end face of the proximal end side link hub 14 (the distal end side link hub 15), which confronts the distal end side link hub 15 (the proximal end side link hub 14), and is made up of an introducing segment 62a, which is so tapered as to represent a conical shape, and a spherical segment 62b formed in the deepest area of the introducing segment 62a. The center of the spherical portion 62b coincides with the first spherical link center PA (second spherical link center PC). The opposite end portions 61a of the rod member 61 each represent a globular shape sufficient to allow them to be slidingly engaged in the respective spherical portions 62b.

The angle $\alpha$ formed between the generatrix E of an inner peripheral surface of the introducing portion 62a and the center line B (C) of the proximal end side link hub 14 (the distal end side link hub 15) is so chosen as to be equal to $\theta_{max}/2$ when the maximum bending angle of the bending angle $\theta$ (best shown in FIG. 3), which is formed between the center line B of the proximal end side link hub 14 and the center line C of the distal end side link hub 15, is expressed by $\theta_{max}$, that is, the angle $\alpha$ is equal to half the maximum bending angle $\theta_{max}$.

As shown in FIG. 11, the rod member 61 is made up of a proximal end side structural body 63, which has a distal end portion 61a engageable in the recessed portion 62 of the proximal end side link hub 14, and a distal end side structural body 64 which has a distal end portion 61a engaged in the recessed portion 62 of the distal end side link hub 15, and a female screw portion 63a of the proximal end side structural body 63 and a male screw portion 64a of the distal end side structural body 64 are threadingly engaged with each other. By changing the amount of threading between the male screw portion 64a and the female screw portion 63a, an inter-center distance M between the distal end portions 61a of the proximal end side structural body 63 and the distal end side structural body 64 is changed. A nut 65 engageable with the male screw portion 64a of the distal end side structural body 64 is provided in adjoining relation with the proximal end side structural body 63 and, by this nut 65, any loosening between the male screw portion 64a and the female screw portion 63a is prevented. It is to be noted that a male screw portion (not shown) is provided in the proximal end side structural body 63 whereas a female screw portion (not shown) is provided in the distal end side structural body 64.

When by the preloading mechanism 60 a preload is applied between the first and second spherical link centers PA and PC of the proximal end side link hub 14 and the distal end side link hub 15, the link actuating device 1 as a whole is held in position applied with the preload and a rattling motion of the link mechanism section 3 is choked. For this reason, the positioning accuracy of the distal end side link hub 15 can be increased, and also, a high rigidity of the link actuating device 1 can be realized. Each of the opposite end portions 61a of the rod member 61 is spherical in shape and respective sites in the recessed portions 62 of the proximal end side link hub 14 and the distal end side link hub 15, in which the opposite end portions 61a are engaged, are so shaped as to represent the spherical portions 62b. Therefore, even though the posture of the distal end side link hub 15 relative to the proximal end side link hub 14 changes, the opposite end portions 61a of the rod member 61 are held in condition positioned at the first spherical link center PA (second spherical link center PC) and no influence is brought about on the operation of the link actuating device 1. Since the rod member 61 is of a design in which the inter-center distance M of the opposite end portions 61a can be altered, the preload amount can be easily adjusted.

Figure 12:
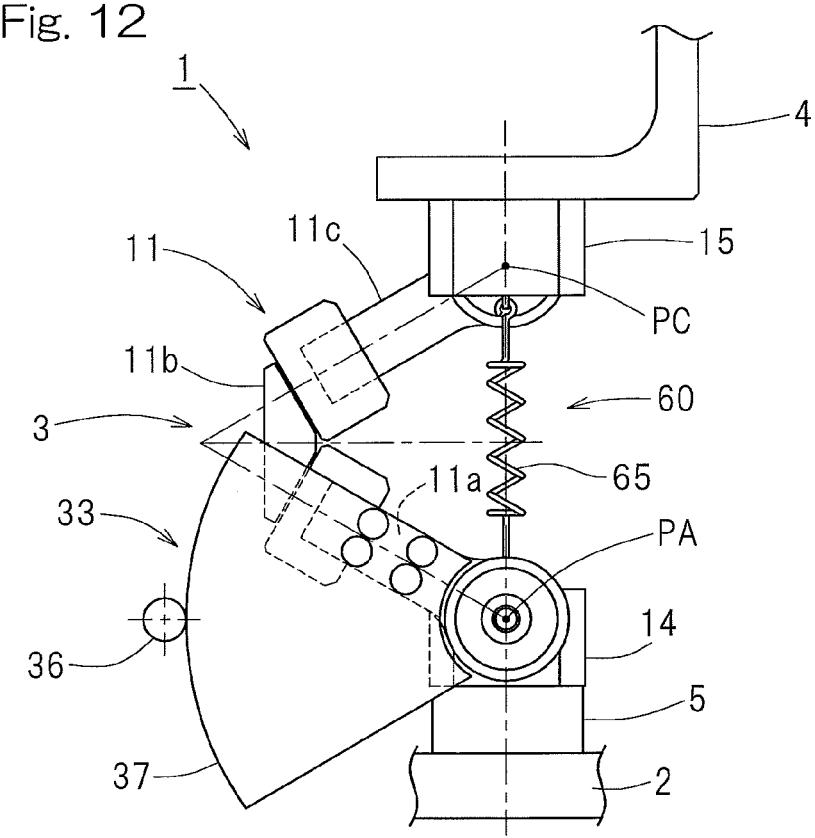
FIG. 12 is a front elevational view showing, with a portion removed, the link actuating device designed in accordance with a fifth preferred embodiment of the present invention.

The preloading mechanism 60 may be of such a structure that as described in connection with a fifth preferred embodiment of the present invention with particular reference to FIG. 12, the proximal end side link hub 14 and the distal end side link hub 15 are connected with each other by means of an elastic member 65 disposed in a line connecting the first and second spherical link centers PA and PC of each of the link mechanism 11 to 13 thereof. Even in this case, in a manner similar to that described hereinbefore, increase of the positioning accuracy of the distal end side link hub 15 and a high rigidity of the link actuating device 1 itself can be realized.

Figure 13:
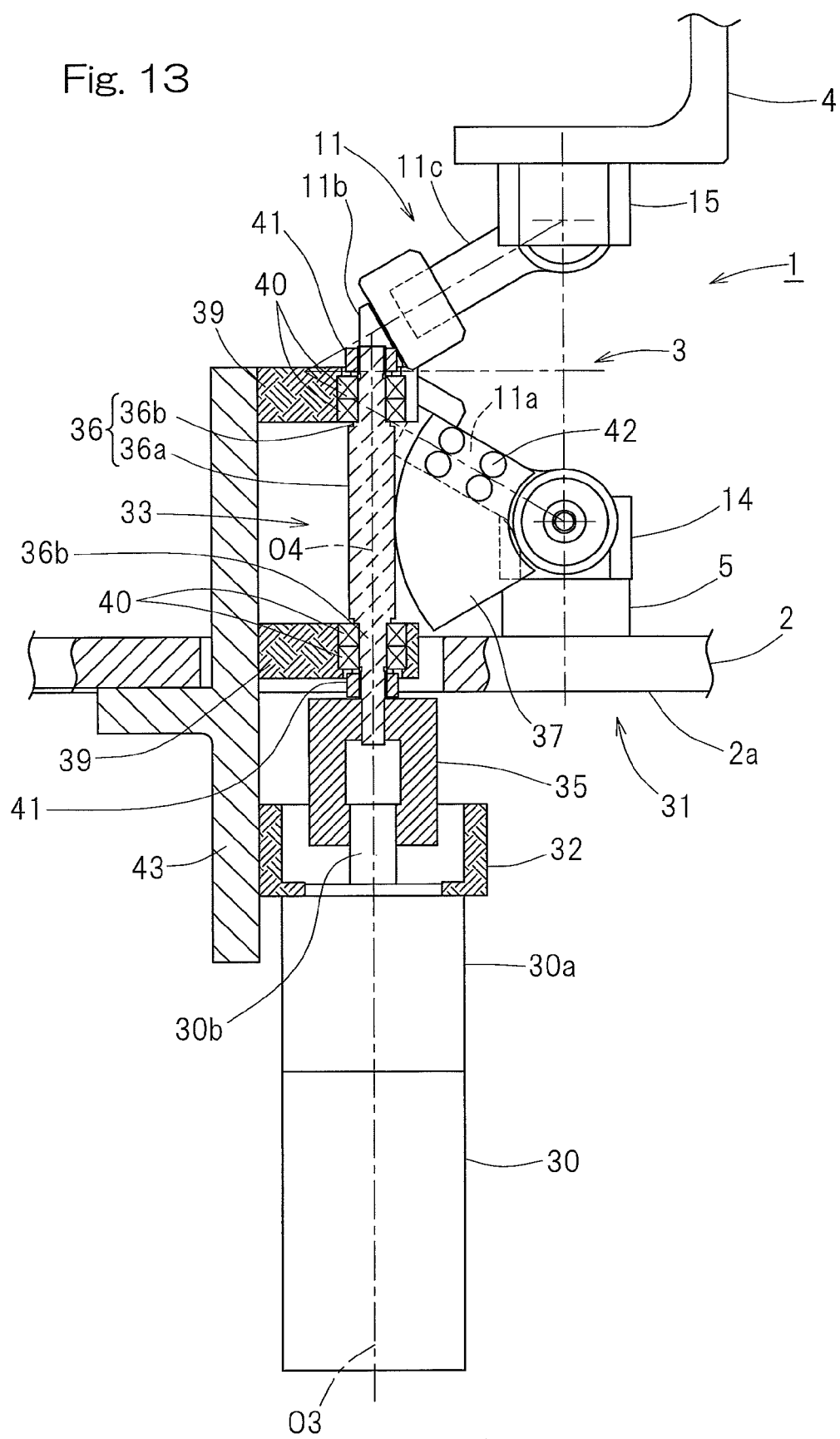
FIG. 13 is a front elevational view showing, with a portion removed, the link actuating device designed in accordance with a sixth preferred embodiment of the present invention.

FIG. 13 illustrates a sixth preferred embodiment of the present invention. Although even the reduction gear unit 31 of the link actuating device 1 shown in FIG. 13 is comprised of a reduction gear 30a of the actuator 30 and geared speed reducing section 33, the geared speed reducing section 33 makes use of the small gear 36 in the form of a worm and the large gear 37 in the form of a work wheel. Even in this case, the radius of the pitch circle of the large gear 37 is so chosen to be ½ or more of the arm length L of the proximal side end link member 11a to 13a. Accordingly, functions and effects can be obtained similar to those afforded when the small gear 36 and the large gear 37 are each employed in the form of a spur gear. It is, however, to be noted that if the radius of the pitch circle of the large gear 37 is so chosen to be 1 or more of the arm length L, the speed reducing ratio is too high and this will occasionally leads to reduction in driving speed.

The small gear 36 in the form of the worm is coupled with the output shaft 30b of the actuator 30 through a coupling 35 for transmission of the rotation. The small gear 36 has a tooth portion 36a engageable with the large gear 37 in the form of the work wheel and shank portions 36b protruding towards opposite sides of the tooth portion 36a, and those shank portions 36b are rotatably supported by respective double row bearings 40. Between respective outer rings (not shown) of the double row bearing 40 is provided with a shim (not shown) and, by fastening a nut 41 threadingly engaged on the shank portion 36b, the bearing 40 is so structured as to receive a preload. The outer ring of each of the bearings 40 is press fitted into a rotation support member 39.

The large gear 37 is a member separate from the proximal side end link member 11a to 13a and is removably fitted to the proximal side end link member 11a to 13 by means of a connecting member 42 such as, for example, a bolt.

The rotation axis O3 of the actuator 30 and the rotation axis O4 of the small gear 36 are aligned to lie on the same axis. Those rotation axes O3 and O4 are perpendicular to a top board 2a of the base 2. The actuator 30 is disposed below the top board 2a and is fixed to a support member 43, which is fixed to the base 2, by means of the motor fixing member 32. The small gear 36 is disposed above the top board 2a and the bearing 40 for rotatably supporting the small gear 36 is provided on upper and lower rotation support members 39. If the small gear 36 in the form of the worm and the large gear 37 in the form of the worm wheel are meshed with each other, the rotation axis O3 of the actuator 30 and the rotation axis O4 of the small gear 36 may be disposed having been oriented in a different direction.

Even with the link actuating device 1 according to the sixth embodiment, functions and effects similar to those afforded by the previously described embodiments can be obtained. In addition, the use of the small gear 36 in the form of the work and the large gear 37 in the form of the work wheel is effective to facilitate the manufacture of the small gear 36 and the large gear 37 and a large speed reducing ratio can be obtained.

In each of the foregoing embodiments, although the use has been made of the reduction gear units 31 and the actuators 30 of all of the three set of the link mechanisms 11 to 13, even when the structure is employed in which the actuator 30 and the reduction gear unit 31 are employed for only two sets of the link mechanism, the posture of the distal end side link hub 15 can be altered relative to the proximal end side link hub 14.

It is, however, to be noted that as compared with the case in which they are provided for the three set, there is the possibility that a rattling motion may occur in, for example, the reduction gear unit 31. The number of the link mechanisms may not be necessarily limited to the three sets such as shown and described in connection with the various embodiments and four or more sets may be employed accordingly.

Although in describing the various preferred embodiments, the rotation axis O3 of the actuator 30 and the rotation axis O4 of the small gear 36 have been shown and described as lying on the same axis, if rotation of the actuator can be transmitted to the small gear 36, the actuator 30 and the small gear 36 may not be disposed in a specific arrangement such as shown and described and may be disposed in any other arrangement.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Link actuating device
11, 12, 13 . . . Link mechanism
11a, 12a, 13a . . . Proximal side end link member
11b, 12b, 13b . . . Intermediate link member
11c, 12c, 13c . . . Distal side end link member
14 . . . Proximal end side link hub
15 . . . Distal end side link hub
30 . . . Actuator
31 . . . Reduction gear unit
33 . . . Geared speed reducing section
36 . . . Small gear
36a . . . Tooth portion
36b . . . Shank portion
37 . . . Large gear
40 . . . Bearing
60 . . . Preloading mechanism
61 . . . Rod member
62 . . . Recessed portion
65 . . . Elastic member
O1 . . . Revolute pair axis of the proximal end side link hub and the proximal side end link member
O3 . . . Rotation axis of the actuator
O4 . . . Rotation axis of the small gear
PA . . . Spherical link center of the proximal end side link hub
PC . . . Spherical link center of the distal end side link hub

What is claimed is:

1. A link actuating device comprising: a proximal end side link hub; a distal end side link hub; and three or more sets of link mechanisms to connect the proximal end side link hub with the distal end side link hub for alteration in posture,
  wherein each of the link mechanisms includes proximal and distal side end link members, which are rotatably connected at one ends thereof with the proximal end side link hub and the distal end side link hub, respectively, and an intermediate link member to rotatably connect the proximal and distal side end members at the other ends thereof, wherein each of the link mechanisms is of such a shape that a geometric model of the link mechanism depicted in a line represents that a distal end side portion and a proximal end side portion relative to a center portion of the corresponding intermediate link member are symmetrical relative to each other, wherein at least two of the three or more sets of the link mechanisms are provided with an actuator to rotate the proximal side end link member to thereby arbitrarily alter the posture of the distal end side link hub relative to the proximal end side link hub, and a reduction gear unit to reduce the speed of and transmit the amount of operation of the actuator to the proximal side end link member, wherein the reduction gear unit includes a geared speed reducing section having a combination of a small gear and a large gear, the small gear being rotated by the drive of the actuator, the large gear being provided in the proximal side end link member for rotation about a first revolute pair axis of the proximal end side link hub and the proximal side end link member, and wherein the large gear has a radius of pitch circle greater than that of the small gear, and the radius of the pitch circle of the large gear is equal to or greater than ½ of an arm length of the proximal side end link member, the arm length being represented by the distance from a first axial center point of the first revolute pair axis to a point at which a second axial center point of a second revolute pair axis of the proximal side end link member and the intermediate link member is projected on a plane passing through the first axial center point and right angles to the first revolute pair axis.

2. The link actuating device as claimed in claim 1, in which the radius of the pitch circle of the large gear is equal to or greater than the arm length of the proximal side end link member.

3. The link actuating device as claimed in claim 1, in which the large gear is a member separate from the proximal side end link member and is removable relative to the proximal side end link member.

4. The link actuating device as claimed in claim 1, in which the large gear is a member integral with the proximal side end link member.

5. The link actuating device as claimed in claim 1, in which the speed reducing ratio of the geared speed reducing section is 10 or higher.

6. The link actuating device as claimed in claim 1, in which the small gear has a tooth portion engageable with the large gear and a pair of shank portions extending from the tooth portion in a direction axially towards opposite sides, each of the pair of the opposite shank portions being rotatably supported by a bearing.

7. The link actuating device as claimed in claim 1, in which each of the small gear and the large gear is employed in the form of a spur gear.

8. The link actuating device as claimed in claim 7, in which the actuator is a rotary actuator having a rotation axis disposed coaxially with a rotation axis of the small gear, and those rotation axes are disposed on a plane perpendicular to a center axis of the proximal end side link hub and passing through the first revolute pair axis of the proximal end side link hub and the proximal side end link member.

9. The link actuating device as claimed in claim 1, in which the small gear is a worm and the large gear is a worm wheel.

10. The link actuating device as claimed in claim 1, in which three sets of the link mechanisms are employed and the actuator and the reduction gear unit are provided in all of those three sets of the link mechanisms.

11. The link actuating device as claimed in claim 1, further comprising a preloading mechanism to generate a force between first and second spherical link centers, the first spherical link center being a spherical link center of the link mechanism in the proximal end link hub, the second spherical link center being a spherical link center of the link mechanism in the distal end side link hub.

12. The link actuating device as claimed in claim 11, in which the preloading mechanism has a rod member having its opposite ends formed to represent spherical shapes, the spherically shaped opposite ends of the rod member being slidingly engaged in respective spherically shaped recessed portions formed in the proximal end side link hub and the distal end side link hub, each of the recessed portions having a center aligned with each of first and second spherical link centers.

13. The link actuating device as claimed in claim 11, in which the preloading mechanism is of a structure in which the distal end side link hub and the proximal end side link hub are connected together by means of an elastic member disposed in a straight line connecting the first and second spherical link centers.

14. The link actuating device as claimed in claim 1, in which assuming that the angle of rotation of the proximal side end link member relative to the proximal end side link hub is expressed by $\beta n$, the angle formed between a connecting end axis of the intermediate link member, which is rotatably connected with the proximal side end link member, and a connecting end axis of the intermediate link member, which is rotatably connected with the distal side end link member is expressed by $\gamma$, the angle of spacing of each of the proximal side end link members relative to the proximal side end link member, which serves as a reference, in a circumferential direction is expressed by $\delta n$, the vertical angle of inclination of a center axis of the distal end side link hub relative to a center axis of the proximal end side link hub is expressed by $\theta$, and the horizontal angle of inclination of the center axis of the distal end side link hub relative to the center axis of the proximal end side link hub is expressed by $\phi$, the posture of the distal end side link hub relative to the proximal end side link hub is controlled when the following equation is reverse conversed;

$$[\cos(\theta/2)\sin \beta n]-[\sin(\theta/2)\sin(\phi+\delta n)\cos \beta n]+\sin(\gamma/2)=0.$$

* * * * *